US011473930B2

(12) United States Patent
Kawasaki et al.

(10) Patent No.: US 11,473,930 B2
(45) Date of Patent: Oct. 18, 2022

(54) POI INFORMATION UPDATING DEVICE

(71) Applicant: NTT DOCOMO, INC., Chiyoda-ku (JP)

(72) Inventors: Satoshi Kawasaki, Chiyoda-ku (JP); Yusuke Fukazawa, Chiyoda-ku (JP); Masatoshi Kimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 2 days.

(21) Appl. No.: 16/961,794

(22) PCT Filed: Mar. 4, 2019

(86) PCT No.: PCT/JP2019/008458
§ 371 (c)(1),
(2) Date: Jul. 13, 2020

(87) PCT Pub. No.: WO2019/207963
PCT Pub. Date: Oct. 31, 2019

(65) Prior Publication Data
US 2021/0072042 A1    Mar. 11, 2021

(30) Foreign Application Priority Data

Apr. 25, 2018  (JP) .............................. JP2018-084116

(51) Int. Cl.
*G01C 21/00* (2006.01)
*G06F 16/29* (2019.01)
(Continued)

(52) U.S. Cl.
CPC ...... *G01C 21/3811* (2020.08); *G01C 21/3476* (2013.01); *G01C 21/3679* (2013.01); *G06F 16/29* (2019.01)

(58) Field of Classification Search
CPC ............ G01C 21/3811; G01C 21/3476; G01C 21/3679; G06F 16/29
See application file for complete search history.

(56) References Cited

U.S. PATENT DOCUMENTS

2010/0246789 A1 * 9/2010 Vance ..................... H04L 67/24
379/201.01
2013/0304372 A1 * 11/2013 Mellert .............. G01C 21/3679
701/410

(Continued)

FOREIGN PATENT DOCUMENTS

JP         2012073061 A  *  4/2012  ............ G01C 21/26
JP         2016-18347 A     2/2016
(Continued)

OTHER PUBLICATIONS

English translation of KR-20120087268-A.*
(Continued)

*Primary Examiner* — Rami Khatib
*Assistant Examiner* — Gabriel J Lambert
(74) *Attorney, Agent, or Firm* — Oblon, McClelland, Maier & Neustadt, L.L.P.

(57) ABSTRACT

A POI (Point Of Interest) information updating device (1) includes an input unit (10) configured to input POI identification information for identifying a POI, an acquisition unit (11) configured to acquire event information on an event performed at a target POI identified by the POI identification information input by the input unit, a search unit (12) configured to search for similar event information similar to the event information acquired by the acquisition unit (11), and an updating unit (13) configured to update information on the target POI on the basis of information on a POI at which an event indicated by the similar event information searched for by the search unit (12) has been performed.

6 Claims, 6 Drawing Sheets

(51) Int. Cl.
  *G01C 21/34* (2006.01)
  *G01C 21/36* (2006.01)

(56) References Cited

U.S. PATENT DOCUMENTS

| | | | |
|---|---|---|---|
| 2014/0258309 A1* | 9/2014 | Young ..................... | G06F 16/95 |
| | | | 707/748 |
| 2017/0053034 A1* | 2/2017 | Tsuboi ............. | G06F 16/24578 |
| 2018/0017408 A1* | 1/2018 | Suzuki ............... | G01C 21/3679 |
| 2019/0050775 A1* | 2/2019 | Bijor ....................... | H04L 67/22 |
| 2020/0045497 A1* | 2/2020 | Kang .................... | H04W 4/025 |

FOREIGN PATENT DOCUMENTS

| | | | | | |
|---|---|---|---|---|---|
| KR | 20120087268 A | * | 8/2012 | ............ | G06Q 50/00 |
| KR | 20150015259 A | * | 2/2015 | ............ | G06F 17/30 |

OTHER PUBLICATIONS

JP-2012073061A English Translation.*
KR-20150015259A English Translation.*
International Search Report dated May 21, 2019 in PCT/JP2019/008458 filed on Mar. 4, 2019, 1 page.
International Preliminary Report on Patentability dated Nov. 5, 2020 in PCT/JP2019/008458 filed Mar. 4, 2019, (submitting English translation only), 6 pages.

* cited by examiner

Fig. 2

| | POI NAME | ADDRESS | LATITUDE AND LONGITUDE | CATEGORY | EVENT INFORMATION UPDATING DATE AND TIME | NUMBER OF EVENTS |
|---|---|---|---|---|---|---|
| 1 | ABC SHOPPING MALL | ... MINATO-KU, TOKYO | 35.655593306, 139.755023249 | COMPLEX COMMERCIAL FACILITY | 2018/1/15 00:00 | 20 |
| 2 | 123 HALL | ... CHIYODA-KU, TOKYO | 35.673560573, 139.740418079 | EVENT FACILITY | 2018/1/15 00:00 | 100 |
| 3 | xyz STADIUM | ... CHIYODA-KU, TOKYO | 35.673560573, 139.740418079 | STADIUM | 2018/1/15 00:00 | 30 |

Fig.3

| | EVENT NAME | START DATE AND TIME | END DATE AND TIME | EVENT CATEGORY | PERFORMANCE POI |
|---|---|---|---|---|---|
| 1 | ABC EXHIBITION | 2018/1/15 10:00 | 2018/2/15 10:00 | EXHIBITION | ABC SHOPPING MALL |
| 2 | 123 CAMPAIGN | 2018/3/15 00:00 | 2018/3/21 00:00 | SALE | ABC SHOPPING MALL |
| 3 | xyz THEATER PERFORMANCE | 2018/2/15 11:00 | 2018/2/15 12:00 | PERFORMING ARTS | 123 HALL |
| 4 | CBA LIVE | 2018/2/15 18:00 | 2018/2/15 19:00 | MUSIC | xyz STADIUM |

Fig.4

| | EVENT NAME | START DATE AND TIME | END DATE AND TIME | CATEGORY | PERFORMANCE POI | EVENT INFORMATION UPDATING DATE AND TIME |
|---|---|---|---|---|---|---|
| 1 | ABC EXHIBITION | 2018/1/15 10:00 | 2018/2/15 10:00 | EXHIBITION | ABC SHOPPING MALL | 2018/1/15 00:00 |
| 2 | 123 CAMPAIGN | 2018/3/15 00:00 | 2018/3/21 00:00 | SALE | ABC SHOPPING MALL | 2018/1/15 00:00 |
| 3 | xyz THEATER PERFORMANCE | 2018/2/15 11:00 | 2018/2/15 12:00 | PERFORMING ARTS | 123 HALL | 2018/1/15 00:00 |
| 4 | CBA LIVE | 2018/2/15 18:00 | 2018/2/15 19:00 | MUSIC | xyz STADIUM | 2018/1/15 00:00 |

POI INFORMATION UPDATING DEVICE

TECHNICAL FIELD

It is related to a POI (Point Of Interest) information updating device that updates information on a POI.

BACKGROUND ART

Patent Literature 1 below discloses an image management device that processes a change of a name of a landmark.

CITATION LIST

Patent Literature

[Patent Document 1] Japanese Unexamined Patent Publication No. 2016-018347

SUMMARY OF INVENTION

Technical Problem

The image management device has a problem that, when the name of the landmark has been changed, an administrator of a server needs to change landmark information, such that updating of the information is not performed efficiently.

Therefore, it has been made in view of such a problem, and an object is to provide a POI information updating device capable of performing updating of POI information more efficiently.

Solution to Problem

In order to solve the above problems, a POI (Point Of Interest) information updating device according to an aspect of the present invention includes an input unit configured to input POI identification information for identifying a POI; an acquisition unit configured to acquire event information on an event performed at a target POI identified by the POI identification information input by the input unit; a search unit configured to search for similar event information similar to the event information acquired by the acquisition unit; and an updating unit configured to update information on the target POI on the basis of information on a POI at which an event indicated by the similar event information searched for by the search unit has been performed.

According to such a POI information updating device, when the POI identification information is input, the event information on the event performed at the target POI is acquired, the similar event information similar to the acquired event information is searched for, and the information on the target POI is updated on the basis of the information on the POI at which the event indicated by the similar event information that has been searched for has been performed. That is, since the information on the target POI can be updated without human intervention, it is possible to perform updating of the POT information more efficiently.

Advantageous Effects of Invention

It is possible to perform updating of POI information more efficiently.

BRIEF DESCRIPTION OF DRAWINGS

FIG. 2 is a diagram illustrating an example of a table of a POI master.

FIG. 3 is a diagram illustrating an example of a table of event information.

FIG. 4 is a diagram illustrating an example of a table of an event log.

DESCRIPTION OF EMBODIMENTS

Figure 1:
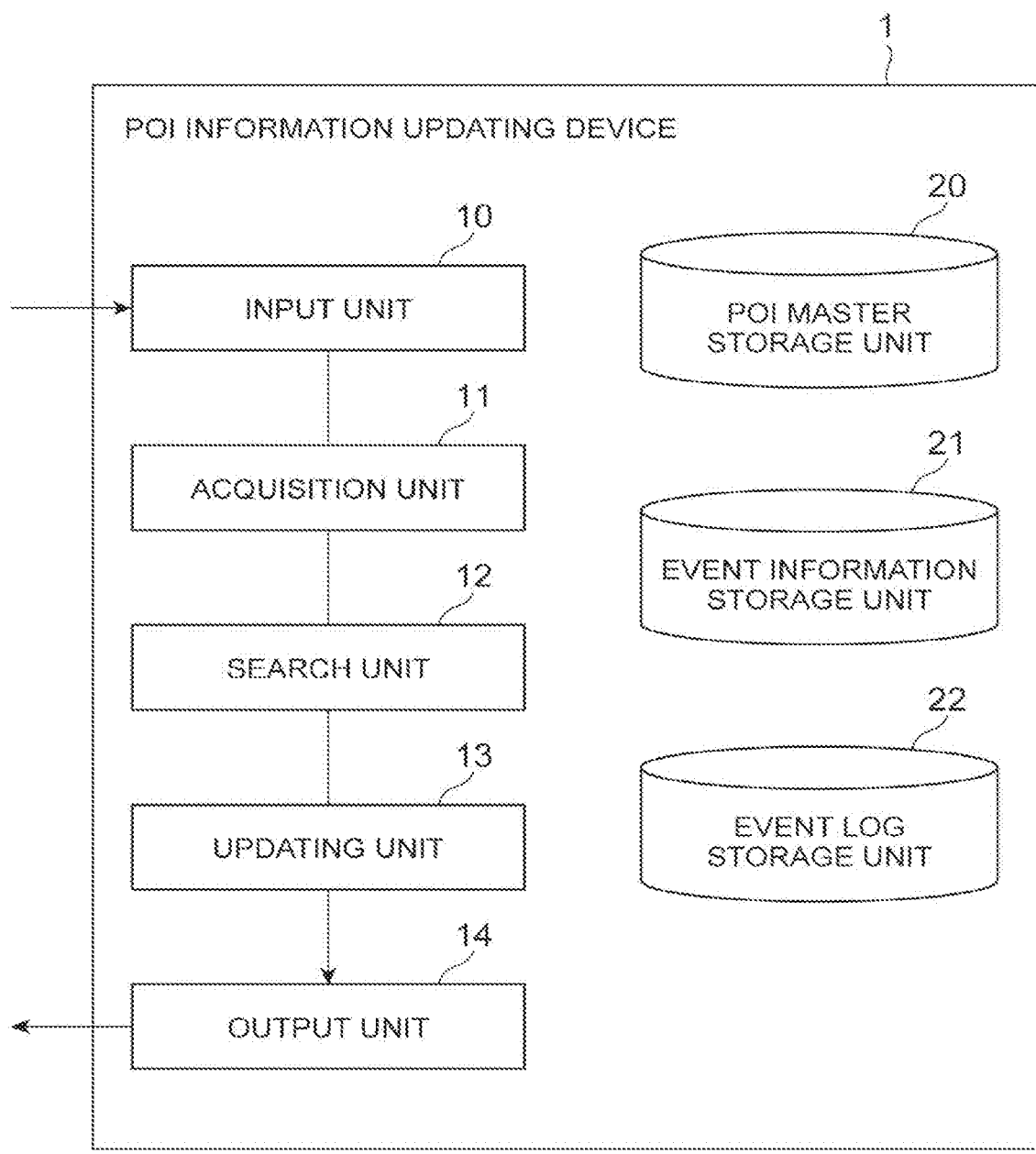
FIG. 1 is a functional block diagram of a POI information updating device according to an embodiment of the present invention.

Hereinafter, embodiments of a POI information updating device 1 will be described in detail with reference to the drawings. In a description of the drawings, the same elements are denoted by the same reference numerals, and redundant description thereof will be omitted. Further, the embodiments in the following description are specific examples of the present invention, and are not limited to these embodiments unless there is a specific description of limiting the present invention.

FIG. 1 is a functional block diagram of a POI information updating device 1. As illustrated in FIG. 1, the POI information updating device 1 includes an input unit 10, an acquisition unit 11, a search unit 12, an updating unit 13, an output unit 14, a POI master storage unit 20, an event information storage unit 21, and an event log storage unit 22. The POI information updating device 1 is a computer device such as a server that updates information on a POI that is a target (a target POI to be described below). The information on a POI includes a name of the POI (a POI name), an address at which the POI is located, a category of the POI, and the like. In the embodiment, the POI name is assumed as the information on the POI, but the present invention is not limited thereto. Further, for example, a function of managing the information on the POI in the POI information updating device 1 may be mounted in another device (for example, a POI management device) connected to the POI information updating device 1 via a network.

Hereinafter, each functional block of the POI information updating device 1 illustrated in FIG. 1 will be described.

The POI master storage unit 20 stores table data of a POI master that is master data of the POI. FIG. 2 is a diagram illustrating an example of the table of the POI master. As illustrated in the example of the table in FIG. 2, the POI master includes a name of the POI (a POI name), an address at which the POI is located, a latitude and longitude at which the POI is located, a category of the POI, an updating date and time of event information (to be described below) on an event performed at the POI (an event information updating date and time), and the number of events (number of events) calculated at a previous time by the acquisition unit 11 to be described below, in association with each other. For example, a first record of the POI master illustrated in FIG. 2 shows that a POI with a POI name "ABC shopping mall" has been updated to an address ". . . , Minato-ku, Tokyo," a latitude and longitude "35.655593306, 139.755023249," a category "Complex commercial facility," and event information "midnight on Jan. 15, 2018" regarding an event performed at the POI, and the calculated number of events calculated at a previous time is "20."

The input unit 10 inputs POI identification information for identifying the POI. The point of interest (POI) is a specific point (a point, a facility, a store, a target, or the like) on a map that the user is interested in. The input unit 10 may extract the POI name, which is the POI identification information, from the POI master storage unit 20 according to predetermined conditions periodically (for example, once a day) and input the POI name (batch processing). Further, the input unit may receive the POI name from the user. The input unit 10 outputs the received POI identification information to the acquisition unit 11.

When the input unit 10 has received information indicating that the user has failed to search for a POI in any search device, the input unit 10 may receive the POI identification information for identifying the POI. When the user has failed to search for a POI, there is a likelihood that the information on the POI has been updated and remains as an old one there is a likelihood that a POI name that is the POI identification information held in the POT master storage unit 20 may remain as an old one although a name has been actually changed. Therefore, when the input unit 10 has received the information indicating that the user has failed to search for a POI, the input unit 10 can update the information on the POI by inputting the POI identification information for identifying the POI (an online process). When the number of times the user has failed to search for a POI exceeds a certain threshold value, the input unit 10 may receive the POI identification information for identifying the POI.

The acquisition unit 11 acquires event information on an event performed at the target POI identified by the POI identification information input by the input unit 10. The acquisition unit 11 outputs the acquired event information to the search unit 12.

The event information storage unit 21 stores a table data of the event information on the event. FIG. 3 is a diagram illustrating an example of a table of the event information. As in the example of the table in FIG. 3, the event information includes a name of an event (an event name), a start date and time of the event, an end date and time of the event, a category of the event (an event category), and a POI at which the event is being performed (held) (performance POI), in association with each other. For example, a first record of the event information illustrated in FIG. 3 shows that an event with an event name "ABC Exhibition" and an event category "Exhibition" has been performed from "10:00, Jan. 15, 2018" to "10:00, Feb. 15, 2018" at an "ABC shopping mall." The event information may further include the number of participants at the event associated therewith. The event information may be posted information (tweets, or the like) such as from a social networking service (SNS) of the user, and may be information on an event not associated with the POI. Further, the event information storage unit 21 may be mounted in another device (an SNS device) connected to the POI information updating device 1 via a network.

For example, the acquisition unit 11 may extract a record having a value of the performance POI that matches the POI name input by the input unit 10 by referring to the event information stored in the event information storage unit 21, and acquire the extracted record as the event information on the event performed at the target POI. When there are a plurality of events performed at the target POI, the acquisition unit 11 acquires a plurality of pieces of event information including respective pieces of event information.

When the acquisition unit 11 has acquired the event information, the acquisition unit 11 may calculate the number of events performed at the target POI, and determine whether or not the search of the search unit 12 will be stopped on the basis of the number of events calculated at a current time and the number of events calculated at a previous time for the same target POI. For example, when the acquisition unit 11 has acquired the event information, the acquisition unit 11 may calculate the number of events performed at the target POI, and compare the calculated number of events with the number of events associated with a value of the same POI name as the target POI in the POI master (illustrated in FIG. 2). The number of events included in the POI master is the number of events calculated at a pervious time for the same target POI. For example, the acquisition unit 11 causes the search of the search unit 12 to be performed as it is when a ratio of the number of events calculated at a current time to the number of events included in the POI master is equal to or less than a predetermined ratio, and stop the search of the search unit 12 when the ratio is more than the predetermined ratio. After the acquisition unit 11 has determined whether or not the search of the search unit 12 is to be stopped, the acquisition unit 11 updates the number of events calculated at a previous time to the number of events calculated at a current time in the POI master.

The search unit 12 searches for similar event information similar to the event information acquired (input) by the acquisition unit 11. The search unit 12 may determine a similarity between the event information on the basis of at least one of a holding period of an event, a name of the event, and the number of participants at the event in the event information. The search unit 12 outputs the similar event information that has been searched for, to the updating unit 13.

Hereinafter, an example of a degree of matching calculation method in a similarity determination in the search unit 12 will be described. When a similarity between pieces of event information is determined on the basis of the holding period of the event, a certain degree of matching value is subtracted (for example, 2.5%) each time each of a start date and time and an end date and time of the event information is shifted by one day. When a threshold value is equal to or greater than 50%, it is determined that the pieces of event information are similar (similar event information), and when the threshold value is smaller than 50%, it is determined that the pieces of event information are not similar (no similar event information). In addition, the number of days from the start date and time to the end date and time, that is, the number of holding days may be compared with each other for a determination as to whether a change in the number of days is equal to or smaller than a certain value (for example, one day). Further, a proportion of the number of matching morphemes after morpheme division of the name of the event information is used when the similarity between pieces of event information is determined on the basis of the name of the event. When the threshold value is equal to or greater than 80%, it is determined that the pieces of event information are similar (similar event information), and when the threshold value is smaller than 80%, it is determined that the pieces of event information are not similar (no similar event information).

Subsequently, an example of a process of the search unit 12 when there are a plurality of pieces of event information acquired by the acquisition unit 11 will be described. When there are a plurality of events performed at the target POI, the acquisition unit 11 acquires event information on each event. Accordingly, a plurality of pieces of event information are acquired by the acquisition unit 11. In this case, the search unit 12 searches for similar event information similar to each piece of event information.

The updating unit 13 updates the information on the target POI on the basis of the information on the POI at which the event indicated by the similar event information searched for (input) by the search unit 12 has been performed. For example, the updating unit 13 first extracts a performance POI (POI name) associated with the event name of the event indicated by the similar event information searched for by the search unit 12 by referring to the event information stored in the event information storage unit 21. The updating unit 13 then updates the POI name of the target POI to the extracted performance POI by referring to the POI master stored in the POI master storage unit 20, and updates the event information updating date and time to a current date and time. The updating unit 13 outputs the updated information to the output unit 14. It is assumed that a change in the name included even though the POI name of the performance POI indicates the same POI. In this case, the updating is performed using a POI name of which the number thereof is largest among performance POIs in a plurality of pieces of similar event information. When there is only one piece of similar event information, a POI name of which the number of appearances is largest among POI names in a plurality of pieces of posted information used when the event information is extracted may be used.

The event log storage unit 22 stores table data of an event log that is a log of the event information. FIG. 4 is a diagram illustrating an example of the table of the event log. As illustrated in the example of the table illustrated in FIG. 4, the event log further includes the event information updating date and time when the event information has been updated, in association with the same content as the event information.

When the POI name of the target POI in the performance POI is in the event log stored in the event log storage unit 22, the updating unit 13 updates the target POI to the extracted performance POI and updates the event information updating date and time to the current date and time.

Subsequently, an example of a process of the updating unit 13 when there are a plurality of pieces of similar event information searched for by the search unit 12 will be described. For example, the updating unit 13 first extracts a plurality of performance POIs associated with the event name of the event indicated by the plurality of pieces of similar event information searched for by the search unit 12 by referring to the event information stored in the event information storage unit 21. The updating unit 13 then updates the POI name of the target POI with the performance POI of which the number is largest among the extracted performance POIs by referring to the POI master stored in the POI master storage unit 20.

The output unit 14 outputs the information updated (input) by the updating unit 13 with an indication indicating that the information has been updated. In this case, information before updating may also be displayed. Thereby, the user can ascertain the fact that a name of a POI that is a search target has been changed, and recognize that a new POI name presented as a search result is a name of the target POI which the user has tried to search for.

Figure 5:
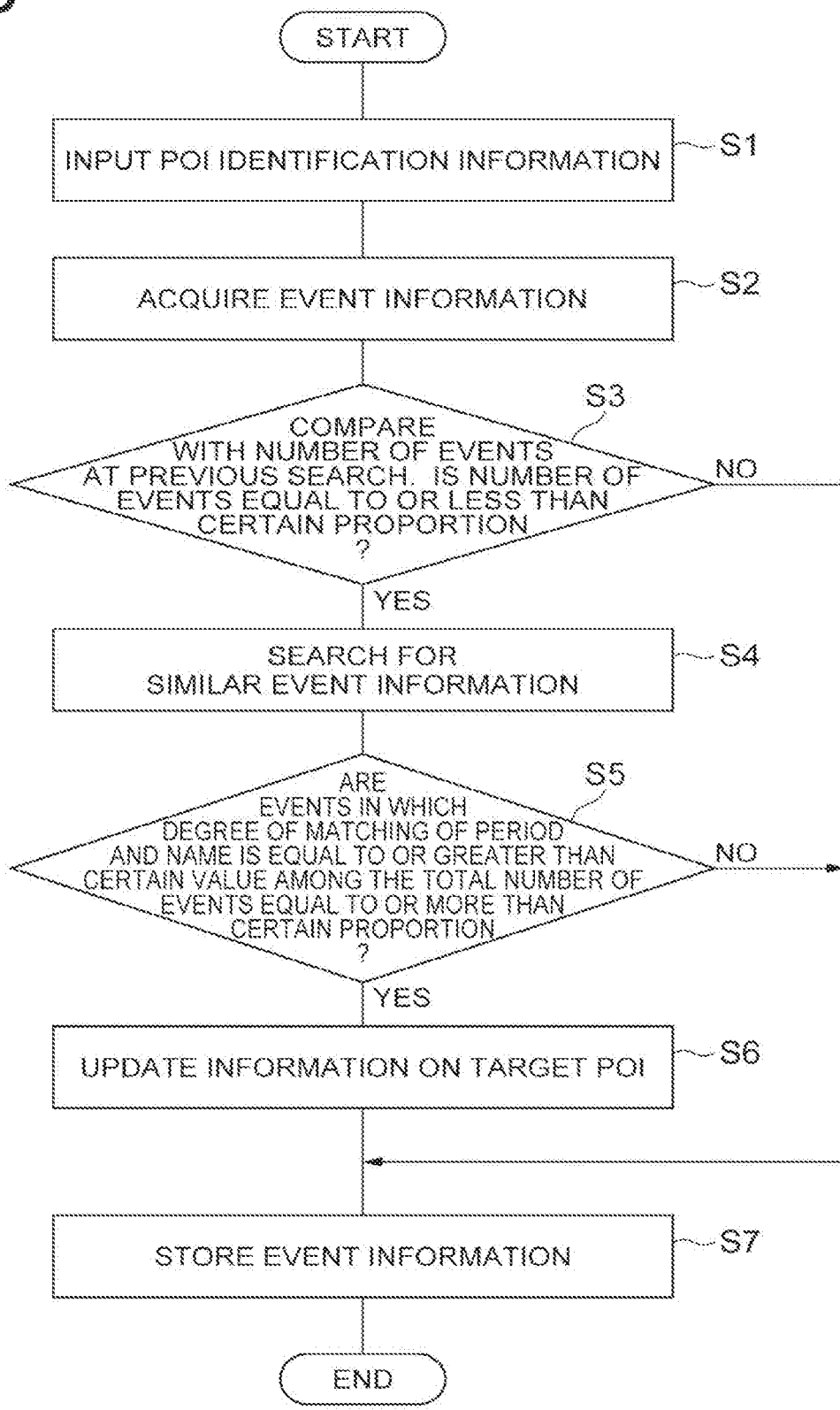
FIG. 5 is a flowchart illustrating a process that is executed by the POI information updating device according to the embodiment of the present invention.

Subsequently, a process of a POI information updating method in the POI information updating device 1 according to the embodiment will be described using the flowchart illustrated in FIG. 5.

First, the acquisition unit 11 inputs the POI identification information (step S1). Then, the acquisition unit 11 acquires the event information on the event performed at the target POI identified by the POI identification information input in S1 (step S2). Then, the acquisition unit 11 compares the number of events calculated at a current time with the number of events calculated at a previous time for the same target POI to determine whether or not the number of events calculated at a current time is equal to or less than a certain proportion (step S3). When it is determined in S3 that the number of events is equal to or less than the certain proportion (S3: YES), the search unit 12 searches for the similar event information similar to the event information acquired in S2 (step S4). Then, the updating unit 13 determines whether or not the number of events indicated by the similar event information searched for in S4 in which a degree of matching of the holding period of the event and the name of the event is equal to or greater than a certain value among the above-described number of events calculated at a current time, is equal to or more than a certain proportion (step S5). When it is determined that the number of events is equal to or more than a certain proportion in S5 (S5: YES), the updating unit 13 updates the information on the target POI on the basis of the information on the POI at which the event indicated by the similar event information searched for in S4 has been performed (step S6). Then, the event information is stored in the event log by the updating unit 13 (step S7). When it is determined in S3 that the number of events is not equal to or less than the certain proportion (S3: NO) and when it is determined in S5 that the number of events is not equal to or more than the certain proportion (S5: NO), the process proceeds to S7.

Next, operations and effects of the POI information updating device 1 configured as in the embodiment will be described.

According to the POI information updating device 1 of the embodiment, when the POI identification information is input, the event information on the event performed at the target POI is acquired, the similar event information similar to the acquired event information is searched for, and the information on the target POI is updated on the basis of the information on the POI at which the event indicated by the similar event information that has been searched for has been performed. That is, since the information on the target POI can be updated without human intervention, it is possible to perform updating of the POI information more efficiently.

According to the POI information updating device 1 of the embodiment, the search unit 12 may determine the similarity between the event information on the basis of at least one of the holding period of the event, the name of the event, and the number of participants at the event in the event information. Thereby, it is possible to determine the similarity more accurately on the basis of at least one of the holding period of the event, the name of the event, and the number of participants in the event.

According to the POI information updating device 1 of the embodiment, when the acquisition unit 11 has acquired the event information, the acquisition unit 11 may calculate the number of events performed at the target POI, and determine whether or not the search of the search unit 12 will be stopped on the basis of the number of events calculated at a current time and the number of events calculated at a previous time for the same target POI. For example, generally, when the name of the POI has been changed, the number of events calculated at a current time is smaller than the number of events calculated at a previous time for the same target POI. That is, by adopting the above configuration, it is possible to determine whether or not the name of the POI has been changed, and an increase in speed of the processing can be achieved such that subsequent unnecessary process need not be performed.

The POI information updating device 1 according to the embodiment may further include the output unit 14 that outputs the information updated by the updating unit 13 with an indication indicating that the information has been updated. Thereby, monitoring with the updated information is enhanced, and the user can easily ascertain the updated information, thereby improving usability.

Incidentally, the name of a POI is likely to change due to naming rights for a facility name. In the related art, information is manually changed, or another name indicating the same facility is extracted through text analysis of a Web or the like. However, there is concern that the same facility will be changed to different names or concern that names other than a formal name after changing such as a popular name may appear as candidates in text analysis. Therefore, the POI information updating device 1 according to the embodiment regards POIs associated with events performed with names or periods similar to a previous event associated with a relevant POI as being the same. A facility in which there are naming rights is a popular facility, at which many regular events are held. For events performed at the POIs, a degree of similarity between the events is calculated using a holding time, a name, the number of participants, or the like, and it is estimated that the POIs are the same POI. The event extraction may be performed through text analysis of an SNS. Since the POI name is also extracted from the SNS, the POI name cannot be linked in latitude and longitude information. According to the POI information updating device 1 of the embodiment, it is possible to perform updating of the POI information more efficiently.

The block diagram used for the description of the above embodiment illustrates blocks in units of functions. Functional blocks (constituent units) thereof are realized by an arbitrary combination of hardware and/or software. Further, a means for realizing each functional block is not particularly limited. That is, each functional block may be realized by one physically and/or logically coupled device or may be realized by a plurality of devices in which two or more physically and/or logically separate devices may be connected directly and/or indirectly (for example, by a cable and/or wirelessly).

Figure 6:
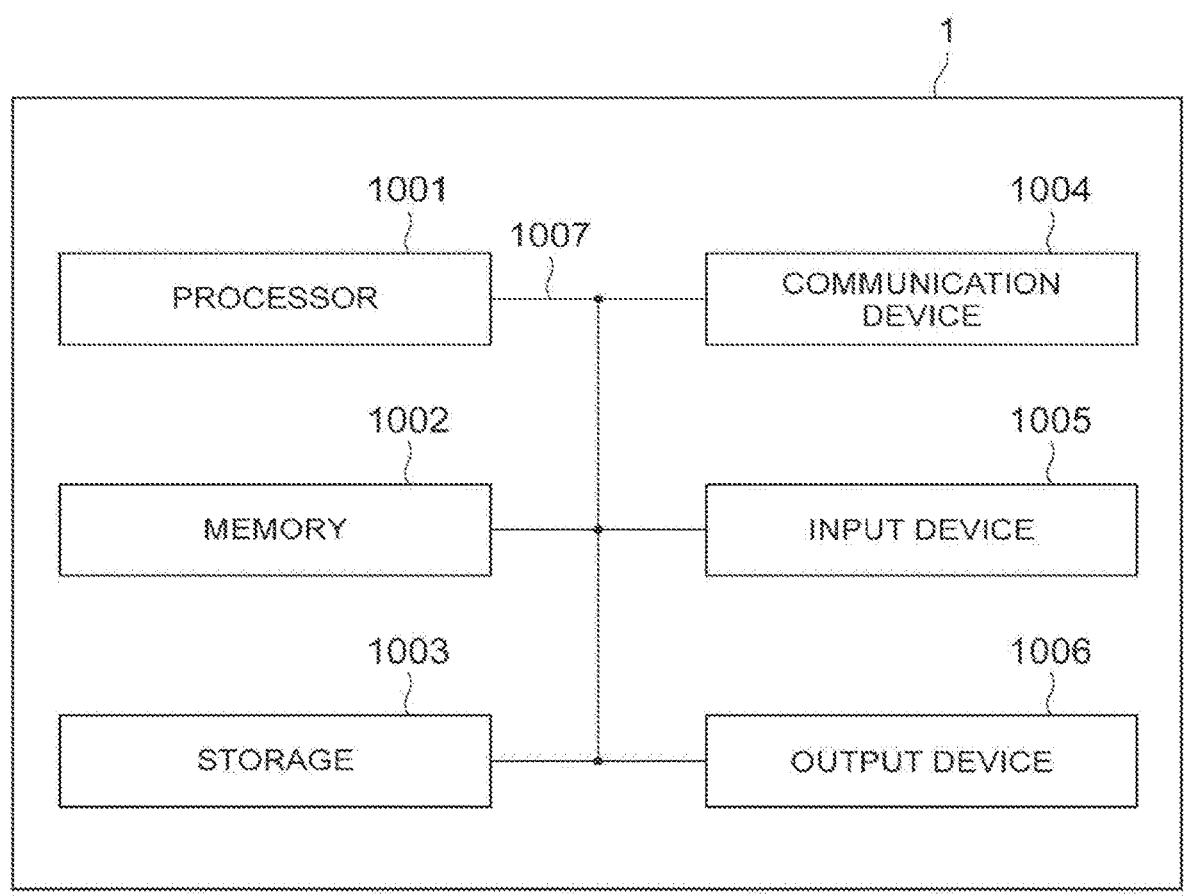
FIG. 6 is a hardware configuration diagram of the POI information updating device according to the embodiment of the present invention.

For example, the POI information updating device according to an embodiment of the present invention may function as a computer that performs the process of the POI information updating method according to an embodiment of the present invention. FIG. 6 is a diagram illustrating an example of a hardware configuration of the POI information updating device 1 according to the embodiment of the present invention. The POI information updating device described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the POI information updating device may include one or a plurality of illustrated devices, or may be configured without including some of the devices.

Each function in the POI information updating device is realized by loading predetermined software (a program) into hardware such as the processor 1001 or the memory 1002 so that the processor 1001 performs calculation to control communication that is performed by the communication device 1004 or reading and/or writing of data into the memory 1002 and the storage 1003.

The processor 1001, for example, operates an operating system to control the entire computer. The processor 1001 may be configured as a central processing unit (CPU) including an interface with peripheral devices, a control device, a calculation device, a register, and the like. For example, the input unit 10, the acquisition unit 11, the search unit 12, the updating unit 13, and the output unit 14 described above may be realized by the processor 1001.

Further, the processor 1001 reads a program (program code), a software module, or data from the storage 1003 and/or the communication device 1004 to the memory 1002 and executes various processes according to the program, the software module, or the data. As the program, a program for causing the computer to execute at least part of the operations described in the above embodiment may be used. For example, the input unit 10, the acquisition unit 11, the search unit 12, the updating unit 13, and the output unit 14 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the POI information updating method according to the embodiment of the present invention.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission and reception device) for performing communication between computers via a wired and/or wireless network and is also referred to as a network device, a network controller, a network card, or a communication module, for example. For example, the input unit 10, the output unit 14, and the like may be realized by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured as a single bus or may be configured as buses different between the devices.

Further, the POI information updating device may include hardware such as a microprocessor, a digital signal processor (DSP), an application specific integrated circuit (ASIC), a programmable logic device (PLD), or a field programmable gate array (FPGA), and a part or all of each functional block may be realized by the hardware. For example, the processor 1001 may be implemented by at least one piece of the hardware.

Notification of information is not limited to the aspects/embodiments described in the present specification, and may be performed by other methods.

Further, each aspect/embodiment described in the present specification may be applied to a system using long term evolution (LTE), LTE advanced (LTE-A), SUPER 3G, IMT-Advanced, 4G, 5G, future radio access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, ultra wide band (UWB), Bluetooth (registered trademark), another appropriate system, and/or a next generation system extended on the basis of these systems.

A process procedure, a sequence, a flowchart, and the like in each aspect/embodiment described in the present specification may be in a different order unless inconsistency arises. For example, for the method described in the present specification, elements of various steps are presented in an exemplified order, and the elements are not limited to the presented specific order.

Information or the like can be output from an upper layer (or a lower layer) to the lower layer (or the upper layer). The information or the like may be input and output through a plurality of network nodes.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Although the present invention has been described in detail above, it is apparent to those skilled in the art that the present invention is not limited to the embodiments described in the present specification. The present invention can be implemented as a modification and change aspect without departing from the spirit and scope of the present invention defined by definition of the claims. Accordingly, the description of the present specification is intended for the purpose of illustration and does not have any restrictive meaning with respect to the present invention.

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, and the like may be transmitted and received via a transmission medium. For example, when software is transmitted from a website, a server, or another remote source using wired technology such as a coaxial cable, an optical fiber cable, a twisted pair and a digital subscriber line (DSL) and/or wireless technology such as infrared rays, radio, and microwaves, those wired technology and/or wireless technology are included in the definition of the transmission medium.

The information, signals, and the like described in the present specification may be represented by any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

The terms described in the present specification and/or terms necessary for understanding of the present specification may be replaced by terms having the same or similar meanings.

The terms "system" and "network" used in the present specification are used interchangeably with each other.

Further, information, parameters, and the like described in the present specification may be represented by an absolute value, may be represented by a relative value from a predetermined value, or may be represented by corresponding different information.

The names used for the above-described parameters are not definitive in any way. Further, mathematical expressions and the like using those parameters are different from those explicitly disclosed in the present specification in some cases.

The term "determining" used in the present specification may include a variety of operations. The "determining" can include, for example, regarding judging, calculating, computing, processing, deriving, investigating, looking up (for example, looking up in a table, database or another data structure), or ascertaining as "determining." Further, "determining" can include, for example, regarding receiving (for example, receiving information), transmitting (for example, transmitting information), inputting, outputting, or accessing (for example, accessing data in a memory) as "determining." Further, "determining" can include regarding resolving, selecting, choosing, establishing, comparing or the like as "determining." That is, "determining" can include regarding a certain operation as "determining."

The terms "connected," "coupled," or any modification thereof means any direct or indirect connection or coupling between two or more elements, and can include the presence of one or more intermediate elements between two elements "connected" or "coupled" to each other. The coupling or connection between elements may be physical, may be logical, or may be a combination thereof. In the present specification, two elements can be considered to be "connected" or "coupled" to each other by using one or more wires, cables, and/or printed electrical connections, or by using electromagnetic energy such as electromagnetic energy having wavelengths in a radio frequency region, a microwave region, and a light (both visible and invisible) region as some non-limiting and non-comprehensive examples.

The description "based on" used in the present specification does not mean "based only on" unless otherwise noted. In other words, the description "based on" means both of "based only on" and "based at least on."

When terms such as "first" and "second" have been used in the present specification, any reference to elements thereof does not generally limit an amount or order of these elements. These terms can be used in the present specification as a convenient way to distinguish between two or more elements. Thus, reference to the first and second elements does not mean that only two elements can be adopted there or that the first element has to precede the second element in some way.

A "means" in the configuration of each device may be replaced with "unit," "circuit," "device," or the like.

As long as "including," "comprising" and modification of them are used in the present specification or claims, those terms are intended to be comprehensive like the term "comprise." Further, the term "or" used in the present specification or claims is intended not to be exclusive OR.

Throughout the present disclosure, it is assumed that, for example, when an article has been added by translation like a, an, and the in English, these articles include a plurality of things unless not clearly indicated otherwise by the context.

REFERENCE SIGNS LIST

1: POI information updating device
10: Input unit
11: Acquisition unit
12: Search unit
13: Updating unit
14: Output unit
20: POI master storage unit
21: Event information storage unit
22: Event log storage unit

The invention claimed is:

1. A POI (Point Of Interest) information updating device comprising a circuitry configured to:
input POI identification information for identifying a POI;
acquire event information on an event performed at a target POI identified by the input POI identification information by obtaining the event information from a social networking service via a network;
search for similar event information similar to the acquired event information;
update information on the target POI, without human intervention, on the basis of information on a POI at which an event indicated by the searched similar event information by updating a name previously used to identify a location associated with the target POI that is held in a master storage on the basis of a name used to identify that same location in the searched similar event information; and
output information via a display, indicating that the information on the target POT has been updated, to a user, while also displaying the name previously used to identify the location associated with the target POI.

2. The POI information updating device according to claim 1, wherein the circuitry determines a similarity between the event information on the basis of at least one of a holding period of the event, a name of the event and a number of participants at the event in the event information.

3. The POI information updating device according to claim 2, wherein the circuitry calculates a number of events performed at the target POI when the event information is acquired, and determines whether or not the search will be stopped on the basis of a ratio of the number of events calculated at a current time and the number of events calculated at a previous time for the same target POI being greater than a predetermined ratio.

4. The POI information updating device according to claim 1, wherein the circuitry calculates a number of events performed at the target POI when the event information is acquired, and determines whether or not the search will be stopped on the basis of a ratio of the number of events calculated at a current time and the number of events calculated at a previous time for the same target POI being greater than a predetermined ratio.

5. The PO information updating device according to claim 1, wherein when the circuitry has received information indicating that the user has failed to search for the POI, the circuitry automatically inputs POI identification information for identifying the POI.

6. A method, implemented by circuitry of a POI (Point Of Interest) information updating device, comprising:
inputting POI identification information for identifying a POI;
acquiring event information on an event performed at a target POI identified by the input POI identification information by obtaining the event information from a social networking service via a network;
searching for similar event information similar to the acquired event information;
updating information on the target POI, without human intervention, on the basis of information on a POI at which an event indicated by the searched similar event information by updating a name previously used to identify a location associated with the target POI that is held in a master storage on the basis of a name used to identify that same location in the searched similar event information; and
outputting information, via a display, indicating that the information on the target POI has been updated, to a user, while also displaying the name previously used to identify the location associated with the target POI.

* * * * *